(12) United States Patent
Yamazoe et al.

(10) Patent No.: US 10,139,620 B2
(45) Date of Patent: Nov. 27, 2018

(54) HEAD-UP DISPLAY

(71) Applicant: NIPPON SEIKI CO., LTD., Niigata (JP)

(72) Inventors: Takashi Yamazoe, Niigata (JP); Takuro Hirokawa, Niigata (JP)

(73) Assignee: NIPPON SEIKI CO., LTD., Tokyo (JP)

( * ) Notice: Subject to any disclaimer, the term of this patent is extended or adjusted under 35 U.S.C. 154(b) by 0 days.

(21) Appl. No.: 15/561,952

(22) PCT Filed: Mar. 14, 2016

(86) PCT No.: PCT/JP2016/057890
§ 371 (c)(1),
(2) Date: Sep. 26, 2017

(87) PCT Pub. No.: WO2016/158333
PCT Pub. Date: Oct. 6, 2016

(65) Prior Publication Data
US 2018/0129042 A1 May 10, 2018

(30) Foreign Application Priority Data
Mar. 27, 2015 (JP) .................................. 2015-065652

(51) Int. Cl.
*G02B 27/01* (2006.01)
*G02B 13/16* (2006.01)
(Continued)

(52) U.S. Cl.
CPC .............. *G02B 27/01* (2013.01); *B60K 35/00* (2013.01); *G02B 13/16* (2013.01); *G02B 27/14* (2013.01);
(Continued)

(58) Field of Classification Search
CPC .................... B60K 35/00; B60K 37/02; B60K 2350/1072; B60K 2350/2052;
(Continued)

(56) References Cited

U.S. PATENT DOCUMENTS 7,936,518 B2 * 5/2011 Takahashi .............. G02B 27/01
359/630
8,876,294 B2 * 11/2014 Saisho ................. G02B 5/0278
353/11
(Continued)

FOREIGN PATENT DOCUMENTS

JP 2003-237412 A 8/2003
JP 2014-043205 A 3/2014
(Continued)

OTHER PUBLICATIONS

Search Report issued in corresponding International Patent Application No. PCT/JP2016/057890, dated May 17, 2016.

*Primary Examiner* — Loha Ben
(74) *Attorney, Agent, or Firm* — McDermott Will & Emery LLP

(57) ABSTRACT

Provided is a head-up display capable of displaying a plurality of virtual images presented at different distances while increasing the design flexibility in the display device for creating the virtual images. The head-up display comprises: a first display surface disposed to extend the light path of first image light emitted toward a viewer and a second display surface disposed to make the light path of second image light emitted shorter than that of the first image light; a first concave reflector for reflecting the first image light and the second image light; and a second concave reflector for reflecting the image light reflected from the first concave reflector. The first concave reflector is configured such that the first image light and the second
(Continued)

image light intersect with each other in the vertical direction between the first concave reflector and the second concave reflector.

7 Claims, 2 Drawing Sheets

(51) Int. Cl.
    *G09G 5/00*         (2006.01)
    *B60K 35/00*       (2006.01)
    *G06K 9/00*         (2006.01)
    *G02B 27/14*       (2006.01)

(52) U.S. Cl.
    CPC ........... *G06K 9/00805* (2013.01); *G09G 5/00* (2013.01); *B60K 2350/1072* (2013.01); *B60K 2350/2052* (2013.01); *B60R 2300/205* (2013.01)

(58) Field of Classification Search
    CPC .... B60K 2350/2065; B60K 2350/2069; B60R 2300/205; G06K 9/00791; G06K 9/00805; G09G 5/00; G02B 27/01; G02B 27/0101; G02B 27/0149; G02B 27/106; G02B 27/123; G02B 27/14; G02B 27/28; G02B 27/283; G02B 27/40; G02B 13/16; G02B 2027/0118; G02B 2027/0123; G02B 2027/0134; G02B 2027/0138; G02B 2027/0145; G02B 2027/0159; G02B 2027/0187
    USPC .......................... 359/630–633, 636; 345/7–9
    See application file for complete search history.

(56) References Cited

U.S. PATENT DOCUMENTS

| | | | | |
|---|---|---|---|---|
| 9,188,779 | B2* | 11/2015 | Sakai | G02B 27/01 |
| 9,459,452 | B2* | 10/2016 | Hada | G03B 21/2033 |
| 9,599,814 | B2* | 3/2017 | Piehler | G02B 27/0101 |
| 2017/0225568 | A1* | 8/2017 | Kasahara | B60K 35/00 |
| 2017/0235138 | A1* | 8/2017 | Morohashi | B60K 35/00 |
| | | | | 359/631 |

FOREIGN PATENT DOCUMENTS

| | | |
|---|---|---|
| JP | 2014-170112 A | 9/2014 |
| JP | 2015-034919 A | 2/2015 |

\* cited by examiner

[Fig.1]
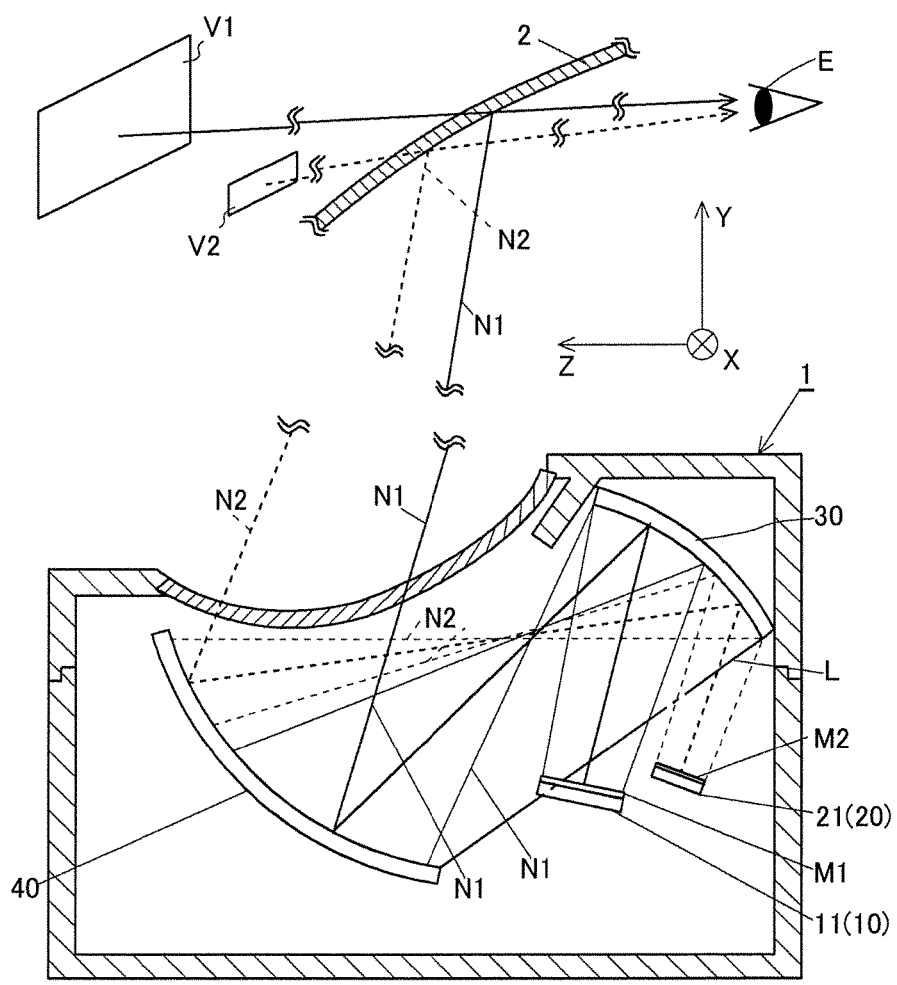

【Fig.2】
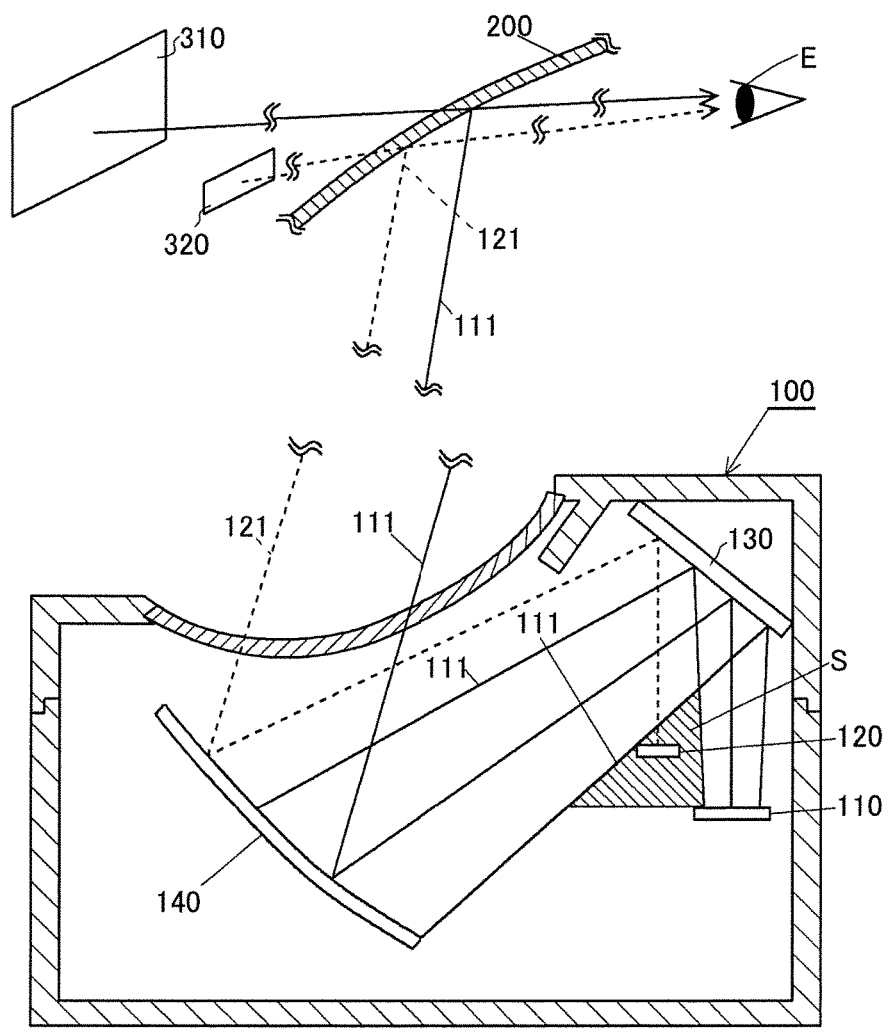

HEAD-UP DISPLAY

CROSS REFERENCE

This application is the U.S. National Phase under 35 U.S.C. § 371 of International Application No. PCT/JP2016/057890, filed on Mar. 14, 2016, which claims the benefit of Japanese Application No. 2015-065652, filed on Mar. 27, 2015, the entire contents of each are hereby incorporated by reference.

TECHNICAL FIELD

The present invention relates to a head-up display of projecting an image onto a reflection transmission surface to thereby cause a person to visually recognize the image in combination with a landscape.

BACKGROUND ART

Conventionally, as a conventional head-up display, there is the one that is disclosed in Patent Literature 1, for example. Such a head-up display is composed of first and second display elements and a reflection-type hologram, and by the reflection-type hologram, image light of the first display element is transmitted, image light of the second display element is reflected, and the rays of image light from the first and second display elements are overlapped each other and then are directed to the transmission reflection surface. The first and second display elements are disposed so as to be different from each other in terms of a distance leading up to a viewer's eyes (a length of an optical path through which the image light passes (an optical path length)); and therefore, it is possible to cause a user to visually recognize a plurality of display images (virtual images) of which display distances are different from each other.

Incidentally, the head-up display that causes a person to visually recognize the plurality of virtual images of which display distances are different from each other can also be configured with the constituent elements as shown in FIG. 2. The head-up display shown in FIG. 2 has: a first display 110 to emit first image light 111; a second display 120 to emit second image light 121; a reflector 130 to reflect the first image light 111 that has been emitted from the first display 110 and the second image light 121 that has been reflected from the second display 120; and a concave reflector 140 to magnify the first image light 111 and the second image light 121 that have been reflected by the reflector 130 and then direct the rays of image light to a front window shield 200 which is mounted on a vehicle. A viewer can visually recognize a first virtual image 310, by the first image light 111 that has been reflected towards the viewer's side by the front window shield 200, and can also visually recognize a second virtual image 320 at a position which is lower in a vertical direction than that of the first virtual image 310, by the second image light 121 that has been reflected at the lower side more significantly than the position of the front window shield 200 on which the first image light 111 has been reflected. The second display 120 is disposed at a position which is more proximal to the viewer than that of the first display 110 in the travelling direction of the light (first image light 111, second image light 121). Therefore, the optical path length of the second image light 121 that is emitted from the second display 120 is smaller than the optical path length of the first image light 110 that is emitted from the first display 110, and the second virtual image 320 that is visually recognized by the second image light 121 is displayed at a position which is more proximal to the viewer than that of the first virtual image 310 that is visually recognized by the first image light 111.

CITATION LIST

Patent Literature

Patent Literature 1; Japanese Unexamined Patent Application Publication No. 2003-237412

SUMMARY OF THE INVENTION

Problems to be Solved by the Invention

However, in the head-up display shown in FIG. 2, the second display (a display surface of the second display) 120 to produce the second virtual image 320 that is small in terms of display distance is disposed at a position which is more proximal to an optical path of the image light (the first image light 111) that is reflected by the reflector 130 than that of the first display (a display surface of the first display) 110. Therefore, the second display (the display surface of the second display) 120 needs to be disposed in a space S shown in FIG. 2, which is at (1) a position that is more proximal to the viewer than that of the first display 110 in the travelling direction of the light (the first image light 111, the second image light 121); and which is also at (2) a position which does not overlap the optical path of the first image light 111 travelling from the first display 110 to the reflector 130; and which is still also at (3) a position which does not overlap the first image light 111 that the reflector 130 has reflected, and a certain restriction occurs as to the degree of freedom in terms of design.

Accordingly, the present invention has been made in view of the problem described above, and it is an object of the present invention to provide a head-up display which is capable of displaying a plurality of virtual images of which display distances are different from each other, the head-up display improving a degree of freedom in terms of design of a display which produces a virtual image.

Means for Solving the Problem

A head-up display according to first aspect of the present invention, of directing image light of a display image which is displayed on a display surface to a transmission reflection surface to thereby cause a viewer to visually recognize a virtual image of the display image, the display surface having: a first display surface to emit first image light, which is disposed so that an optical path length of the first image light leading up to the viewer is large; and a second display surface to emit second image light, which is disposed so that an optical path length of the second image light leading up to the viewer is smaller than an optical path length of the first image light, the head-up display comprising: a first concave reflector to reflect the first image light and the second image light, having a concave reflection surface; and a second concave reflector to reflect towards the transmission reflection surface the first image light and the second image light that have been reflected by the first concave reflector, wherein the first concave reflector crosses the first image light and the second image light to each other in a vertical direction between the first concave reflector and the second concave reflector.

The head-up display according to second aspect, wherein the second display surface is disposed to be spaced more significantly than the first display surface from the optical path of a respective one of the first image light and the second image light that the first concave reflector reflects towards the second concave reflector.

The head-up display according to third aspect, wherein a virtual image which is produced by the second display surface is visually recognized at a lower side in a vertical direction more significantly than a virtual image which is produced by the first display surface.

The head-up display according to fourth aspect, wherein at least a part of the first display surface is disposed at the optical path side of a respective one of the first image light and the second image light that the first concave reflector reflects towards the second concave reflector more significantly than a line which connects an end part at the second display surface side in the first concave reflector and an end part at the second display surface side in the second concave reflector to each other.

Effect of the Invention

It is possible to display a plurality of virtual images of which display distances are different from each other, and it is possible to improve the degree of freedom in terms of design of a display which produces a virtual image as well.

BRIEF DESCRIPTION OF THE DRAWINGS

FIG. 1 is a schematic view showing a head-up display in an embodiment of the present invention.

FIG. 2 is a schematic view showing a conventional head-up display.

MODE FOR CARRYING OUT THE INVENTION

Hereinafter, with reference to FIG. 1, an embodiment of a head-up display of the present invention (hereinafter, referred to as an "HUD") will be described. FIG. 1 is a schematic view showing an example of a construction of an HUD 1 of the embodiment. For the sake of clarity of the following description, as shown in FIG. 1, in a real space, for example, the transverse direction facing the forward direction of a vehicle is defined as the X-axis (the right ward direction is the positive direction of the X-axis); the vertical direction is defined as the Y-axis (the upper side in the vertical direction is the positive direction of the Y-axis); and the longitudinal direction is defined as the Z-axis (the forward direction is the positive direction of the Z-axis). In addition, for the sake of clarity of the drawings, first image light N1 which is emitted from a first display surface 11 and second image light N2 which is emitted from a second display surface 21, which will be described later, are referred to as only: the image light that is emitted at an end part of a respective of the first display surface 11 and the second display surface 21 described in FIG. 1; and the image light that is emitted from a center thereof.

The HUD 1 is mounted on a motor vehicle, for example, and as shown in FIG. 1, is provided with: a first image display part 10 having a first display surface 11 to display a first display image M1; a second image display part 20 having a second display surface 21 to display a second display image M2; a first concave reflector 30 to reflect the first display image M1 that has been emitted from the first display surface 11 and the second display image M2 that has been emitted from the second display surface 21; a second concave reflector 40 to reflect the first image light N1 and the second image light N2 that have been incident from the first concave reflector 30 towards a front window shield (an example of a transmission reflection part) 2 of a vehicle; and a control part which is not shown.

A viewer can visually recognize a first virtual image V1 by the first image light N1 that has been reflected on the viewer's side, by the front window shield 2, and can also visually recognize a second virtual image V2 at a position which is lower in the vertical direction than that of the first virtual image V1, by the second image light N2 that has been reflected at a lower side more significantly than the position of the front window shield 2 on which the first image light N1 has been reflected.

The first virtual image V1 is visually recognized to be larger in size than the second virtual image V2, for example, and is disposed at a position which overlaps a region including a part of the lane at the front side of a real landscape via the front window shield 2. The image to be displayed as the first virtual image V1 is displayed as if it were adhering to a lane, for example, is also a guidance image formed in the shape of the arrow that indicates a guidance route of a vehicle, or alternatively, is a alerted image which is displayed so as to overlap a front side cruising vehicle and which notifies that a distance from the front side cruising vehicle is too short.

The second virtual image V2 is visually recognized to be smaller in size in both the vertical direction and the transverse direction than the first virtual image V1, for example, and is displayed at a position which overlaps the front side more significantly than a lane which the first virtual image V1 overlaps. The image that is displayed as the second virtual image V2 is vehicle information such as a cruising vehicle speed, for example.

The first image display part 10 and the second image display part 20 are intended to display the first display image M1 (the second display image M2) on the first display surface 11 (the second display surface 21), and it is possible to apply a transmission display panel such as a liquid crystal display element, a self-emission display panel such as an organic EL element, a reflection-type display panel such as DMD or LCoS (registered trademark), or a scanning-type display device to scan laser light, for example. The second display surface 21 of the second image display part 20, in comparison with the first display surface 11 of the first image display part 10, is disposed to be spaced from an optical path of a respective one of the first image light N1 and the second image light N2 that the first concave reflector 30 reflects towards the second concave reflector 40, which will be described later. Incidentally, in a case where the first image display part 10 (the second image display part 20) is the reflection-type display device, it follows that a screen is disposed at a position of the first display surface 11 (the second display surface 21) shown in FIG. 1. Incidentally, it is realistic that the screen is of transmission type at the position of the first display surface 11 (the second display surface 21) shown in FIG. 1; and however, it is also possible to apply a reflection-type screen by changing the layout of the first display surface 11, the second display surface 21, the first concave reflector 30, and the second concave reflector 40. The first display image M1 (the second display image M2) that is displayed on the first display surface 11 (the second display surface 21) arrives at the viewer's eyes E via the first concave reflector 30, the second concave reflector 40, and the front window shield 2. Therefore, the first display image M1 (the second display image M2) that is displayed on the first display surface 11 (the second display surface 21), a part of which is deformed by the first concave reflector 30, the second concave reflector 40, and the concave face of the front window shield 2, is visually recognized as the first virtual image V1 (the second virtual image V2). In order to ensure that the first virtual image V1 (the second virtual image V2) is visually recognized without any distortion, the first image display part 10 (the second image display part 20) causes the first display surface 11 (the second display surface 21) to display the first display image M1 (the second display image M2) that has been distorted in advance.

In addition, the size of the first display surface 11 to produce the first virtual image V1 of which display distance is long may be smaller than the size of the second display surface 21 to produce the second virtual image V2 of which display distance is short. Further, the first display surface 11 and the second display surface 21 do not need to be in parallel to each other. Furthermore, although the first display surface 11 (the second display surface 21) shown in FIG. 1 is drawn in the shape of a plane, this surface may have a curved surface.

The first concave reflector 30 is composed of a mirror of which reflection surface is formed in a concave shape, and specifically, is formed so that the curvature corresponding to the vertical direction (the Y-axis direction) in a real space is smaller than the curvature corresponding to the horizontal direction (the X-axis direction), for example. The optical path of the first image light N1 that has been incident from the first display surface 11 and the optical path of the second image light N2 that has been incident from the second display surface 21 are caused to cross each other in the vertical direction (the X-axis direction) and then are made incident to the second concave reflector 40. In addition, the first concave reflector 30 has a function of forming the first image light N1 and the second image light N2 as an intermediate image between the first concave reflector 30 and the second concave reflector 40. The position at which the first image light N1 and the second image light N2 have been formed as the intermediate image is present at the second concave reflector 40 side more significantly than a focal length of a virtual optical system having the optical characteristics between the second concave reflector 40 and the front window shield (transmission reflection part) 2 and is also present near the focal length, thereby enabling the viewer to visually recognize a virtual image obtained by magnifying the first display image M1 that has been displayed on the first display surface 11 and the second display image M2 that has been displayed on the second display surface 21 at a high rate of magnification. Incidentally, the first concave reflector 30 does not need to form the first image light N1 and the second image light N2 as the intermediate image between the first concave reflector 30 and the second concave reflector 40.

The second concave reflector 40 is composed of a free curved mirror of which reflection surface is formed in a concave shape, and the optical path of the first image light N1 that has been incident from the first concave reflector 30 and the optical path of the second image light N2 are made incident to the front window shield 2 without being caused to cross each other. Incidentally, the second concave reflector 40 may be provided with one or a plurality of a function of magnifying the first display image M1 or the second display image M2 to thereby form the first virtual image V1 or the second virtual image V2; a function of correcting distortion of the first virtual image V1 or the second virtual image V2; and a function of displaying the first virtual image V1 or the second virtual image V2. Incidentally, in FIG. 1, although only one second concave reflector 40 is illustrated, it may be formed of a plurality of concave reflectors. In addition, there may be divided into a region in which the first image light N1 is to be reflected and a region in which the second image light N2 is to be reflected.

That is, the first image light N1 that has been emitted from the first display surface 11 is reflected by the first concave reflector 30; the reflected light is incident to the rear side in the longitudinal direction of the vehicle in the second concave reflector 40; the incident light is reflected by the second concave reflector 40 and then the reflected light is incident to the upper side in the vertical direction of the front window shield 2; and the incident light is reflected by the front window shield 2 and then the reflected light arrives at the viewer's eyes E. In addition, the second image light N2 that has been emitted from the second display surface 21 is reflected by the first concave reflector 30; the reflected light is incident to the rear side in the longitudinal direction of the vehicle in the second concave reflector 40; the incident light is reflected by the second concave reflector 40 and then is incident to the upper side in the vertical direction of the front window shield 2; and the incident light is reflected by the front window shield 2 and then arrives at the viewer's eyes E. Incidentally, between the first concave reflector 30 and the second concave reflector 40, there may be provided: a reflection-type relay optical system such as a plane mirror, a curved mirror, or a free curved mirror; a transmission-type, refraction-type relay optical system; or a semi-transmission-type relay optical system such as a half mirror or the like.

Further, at least a part of the first display surface 11 is disposed at the optical path side of a respective one of the first image light N1 and the second image light N2 that the first concave reflector 30 reflects towards the second concave reflector 40 more significantly than the line L that connects: an end part at the second display surface 21 side in the first concave reflector 30; and an end part at the second display surface 21 side in the second concave reflector 40 to each other; it is possible to make the optical path compact; and it is also possible to reduce the size of the HUD 1 to its required minimum.

The HUD 1 in the embodiment has been described hereinabove so far; and however, the present invention is not limited by the above embodiment and the drawings. Of course, it is possible to make alternation(s) (including deletion(s) of the constituent element(s)) thereto. Hereinafter, a modification example is shown.

The foregoing embodiment showed an example in which the first image display part 10 and the second image display part 20 that is the other one are provided; and however, in a case where the reflection-type display panel or the scanning-type display device is employed as an image display part, it may be that the first display surface 11 and the second display surface 21 each are employed as a screen, and that the projection light from the reflection-type display panel or the scanning-type display device that is common thereto is projected to a respective one of the first display surface 11 and the second display surface 21.

In addition, the first display surface 11 and the second display surface 21 may be continuously provided in place of being provided separately.

INDUSTRIAL APPLICABILITY

The present invention can be applied as a head-up display which is mounted on a transportation vehicle such as a vehicle and which causes a user to visually recognize a virtual image.

DESCRIPTION OF REFERENCE NUMERALS

1 . . . HUD (Head-up display)
2 . . . Front window shield (transmission reflection part)
10 . . . First image display part
11 . . . First display surface
20 . . . Second image display part
21 . . . Second display surface
30 . . . First concave reflector
40 . . . Second concave reflector
M1 . . . First display image
M2 . . . Second display image
N1 . . . First image light
N2 . . . Second image light
V1 . . . First virtual image
V2 . . . Second virtual image

The invention claimed is:

1. A head-up display of directing image light of a display image which is displayed on a display surface to a transmission reflection surface to thereby cause a viewer to visually recognize a virtual image of the display image, the display surface having:
a first display surface to emit first image light, which is disposed so that an optical path length of the first image light leading up to the viewer is large; and
a second display surface to emit second image light, which is disposed so that an optical path length of the second image light leading up to the viewer is smaller than the optical path length of the first image light,
the head-up display comprising:
a first concave reflector to reflect the first image light and the second image light, having a concave reflection surface; and
a second concave reflector to reflect towards the transmission reflection surface the first image light and the second image light that have been reflected by the first concave reflector,
wherein the first concave reflector crosses the first image light and the second image light to each other in a vertical direction between the first concave reflector and the second concave reflector.

2. The head-up display according to claim 1, wherein the second display surface is disposed to be spaced more significantly than the first display surface from the optical path of a respective one of the first image light and the second image light that the first concave reflector reflects towards the second concave reflector.

3. The head-up display according to claim 2, wherein a virtual image which is produced by the second display surface is visually recognized at a lower side in the vertical direction more significantly than a virtual image which is produced by the first display surface.

4. The head-up display according to claim 2, wherein at least a part of the first display surface is disposed at the optical path side of a respective one of the first image light and the second image light that the first concave reflector reflects towards the second concave reflector more significantly than a line which connects an end part at the second display surface side in the first concave reflector and an end part at the second display surface side in the second concave reflector to each other.

5. The head-up display according to claim 1, wherein a virtual image which is produced by the second display surface is visually recognized at a lower side in the vertical direction more significantly than a virtual image which is produced by the first display surface.

6. The head-up display according to claim 5, wherein at least a part of the first display surface is disposed at the optical path side of a respective one of the first image light and the second image light that the first concave reflector reflects towards the second concave reflector more significantly than a line which connects an end part at the second display surface side in the first concave reflector and an end part at the second display surface side in the second concave reflector to each other.

7. The head-up display according to claim 1, wherein at least a part of the first display surface is disposed at the optical path side of a respective one of the first image light and the second image light that the first concave reflector reflects towards the second concave reflector more significantly than a line which connects an end part at the second display surface side in the first concave reflector and an end part at the second display surface side in the second concave reflector to each other.

* * * * *